United States Patent [11] 3,587,367

[72] Inventor Richard A. Dotson
 Los Angeles, Calif.
[21] Appl. No. 751,500
[22] Filed Aug. 9, 1968
[45] Patented June 28, 1971

[54] CUTTING TOOL ION NEUTRALIZER AND METHOD
8 Claims, 2 Drawing Figs.
[52] U.S. Cl. .................................................. 82/1, 90/11,
 29/96, 77/5
[51] Int. Cl. ........................................................ B23b 3/00,
 B23c 1/00
[50] Field of Search ............................................ 90/11.1, 11,
 11.3; 82/1, 1.1, 1.4, 916, 900; 29/95, 96; 77/5

[56] References Cited
UNITED STATES PATENTS
| | | | |
|---|---|---|---|
| 2,314,753 | 3/1943 | Asimow | 82/900 |
| 2,452,211 | 10/1948 | Rosenthal | 82/916-X |
| 3,292,237 | 12/1966 | Fisher | 29/95 |
| 3,444,782 | 5/1969 | Mandonas et al. | 90/11.64 |
| 3,463,048 | 8/1969 | Owsen | 90/11 |

Primary Examiner—Gil Weidenfeld
Attorney—Fowler, Knobbe & Martens

ABSTRACT: A method and device for reducing tool wear of metal-cutting tools. The tool life is increased by preventing flow of electrons from the tool and consequent ionization of the tool metal atoms during the machining process. This is accomplished in the preferred embodiment by the use of an ion neutralizer device which senses the polarity and magnitude of electron flow and generates an opposite polarity and equal magnitude electron flow which is directed into the tool. The electron flow is reduced in other embodiments of the device by insulating the tool from the workpiece or by insulating the tool or workpiece from the machine frame.

INVENTOR.
RICHARD A. DOTSON

BY
FOWLER, KNOBBE
& MARTENS
  ATTORNEYS.

CUTTING TOOL ION NEUTRALIZER AND METHOD

BACKGROUND OF INVENTION

A major portion of the wear on metal-cutting tools, such as the tool of a metal-turning lathe is termed "erosion" or "cratering" and occurs primarily just behind the cutting edge of the tool. The craters or pits form during machining and become so deep that the cutting edge of the tool eventually is broken or the tool becomes ineffective and must be replaced. The tool also undergoes wear of its vertical sides or "flank wear" during the machining process. Similar wear in one form or another is observed on all metal-cutting tools such as milling machines, metal-surfacing machines, metal-drilling equipment and the like.

Metal-cutting tool wear is a problem which has plagued the metal-machining industry since its inception. To alleviate the problem, new, harder cutting tool materials such as the carbides have been developed. These materials essentially better withstand the conditions which cause the wear for longer times but do not eliminate what has been found to be a basic cause of tool wear.

The cause of tool wear has formerly been treated as primarily mechanical arising from the resistance of the workpiece to cutting and the frictional forces and shear forces which are produced between the tool and the workpiece during machining. Consequently, all tool modifications which have been made to reduce tool wear have been designed to eliminate only the mechanical causes of the wear.

Some of the proposed solutions to the tool wear problem have resulted in wear reduction, purportedly for mechanical reasons, but I have discovered that other factors may be influencing tool wear and that some of these proposed solutions inadvertently have mollified the effect of such factors. For example, it has been noted (see Machinery, Apr. 1968, p. 75) that if the metal being machined contains oxide inclusions such as calcium, silicon or ferrosilicon which form oxide layers on the surfaces of the cutting tool a thin protective oxide layer will form over the tool increasing its wear resistance and useful life. It has been suggested that these layers are protective layers which prevent cratering of the tool in some mechanical fashion to reduce tool wear. Since the oxide layers are softer than the carbide tools, however, there appears to be little justification for this effect based solely on the mechanical theory of tool wear.

It has now been discovered that a partial cause of the wear is electrical rather than purely mechanical and also that at least a portion of the workpiece behaves as a liquid in the region of the chip formation. This is especially true for high cutting speeds. These discoveries have led to the development of a process and device which have produced dramatic improvements in both tool wear and the machining characteristics of various workpieces.

It is well known that corrosion in general is an electrochemical phenomenon evidenced by the production of a detectable current and migration of electrons and ions from one physical location to another. For example in a limited number of instances the amount of corrosion which has been observed has been quantitatively accounted for by the amount of electric current which has been measured. It is now thought that a corrosionlike electrochemical effect may have a substantial influence on tool cratering.

It is also well known that cavitation of liquids against a solid metal surface can cause severe pitting and a deformation of the solid surface as a result of the shock waves or cavitational forces generated by cavitation of the liquid. The cratering or erosion observed on metal cutting tools is a cavitationlike pitting behind the cutting edge of the machine tool. Since the cavitational forces alone would probably be insufficient to cause such rapid wear of these relatively hard tools, this suggests that such tool wear may arise from a combination of factors rather than from these mechanical forces alone.

Consequently, a solution to the problem of machine tool erosion must take into account these other phenomena which have been observed as factors in the tool wear. A satisfactory solution must include means for compensating for the electrical factor as well as the mechanical. Additionally, for best results the machining process or equipment should be adapted to accentuate the forces generated by cavitation of the workpiece metal at the surface of the tool.

SUMMARY OF INVENTION

This invention relates to a process for reducing machine tool wear which includes the step of reducing electron flow from the cutting tool during the machining process and to means for accomplishing such a reduction in electron flow.

It has been found that a detectable current is produced during the machining process and that any device which will reduce current flow from the tool and consequent ionization of the tool metal will also contribute to increasing the tool life.

It has been observed that the tool life may be enhanced by measuring the electrical discharge from the workpiece and generating an oppositely directed and opposite polarity charge to neutralize the discharge. This is accomplished by the use of circuitry containing differential operation amplifiers and booster amplifiers to detect and neutralize the electron differentials of an insulated tool.

Additionally it has been found that the zone of interface contact between the tool and workpiece, although effective in producing an electrical current, is itself of high resistivity due to the high temperatures generated so that current flow occurs through the circuit completed through the machine spindles which hold the workpiece, the machine frame and the toolpost. This current flow can thus be effectively reduced by insulation of the tool or workpiece from the machine frame. For example, the toolpost may be mounted on the machine by means of a plastic, hard rubber, wooden or other insulating material member or the workpiece may be held by means of spindles coated with or made from such insulating material.

This solution has not been found to be as effective, however, since some current flow still occurs across the high resistivity interface between the tool and the workpiece. Thus even though the amount of tool wear is reduced some ionization still occurs with the subsequent increase in susceptibility to erosion by means of cavitational forces of the workpiece metal on the surface of the tool.

The use of an insulated toolholder in combination with the aforementioned device circuitry has been observed to further reduce the tool wear.

Additionally, the application of an insulating surface such as calcium oxide to the tool surface has also been found to enhance the tool life. These insulating layers reduce electrical contact between the workpiece and tool and, consequently, substantially reduce ionization of the tool metal.

To be satisfactory, the coating should be highly resistant to abrasive removal by contact with the workpiece. Such coating materials include low-conductivity coatings such as barium oxide, calcium oxide, nickel oxide, silicon and any other coating materials which can be applied to the surface of the tool to reduce current flow between the tool and the workpiece and which are not easily scraped off of the tool surface during machining.

While the exact theory by which the process of this invention operates is not precisely known, it is known that when two dissimilar metals are placed in contact and heated a current will be generated as in the Peltier effect of a thermocouple. The electron flow from the heated metals results from ionization of the metallic atoms. It is theorized that during machining the surface atoms of the tool metal are ionized in this manner since current flow can be observed on an oscilloscope during the machining process. For carbide tools the binder metals may be ionized rather than there being an actual disassociation of the carbides.

The metal ions are easier to dislodge from the tool surface than the more strongly bonded atoms. Since these ions are more susceptible to displacement by mechanical forces than the metallic atoms, erosion by the mechanical forces produced by contact with the workpiece metal is accelerated.

With carbide tools ionization of the binder metal and displacement of the metal ions also makes the remaining nonionized carbides more susceptible to erosion.

While the ionization of the tool metal partially explains the tool erosion problem in conjunction with the observed current flow, a further postulate has been made to explain other observed phenomena. The current flow which has been observed occurs as random pulses on an oscilloscope. These pulses are associated with shock waves which periodically move over the tool and through the workpiece. The similarity of such shock waves and concomitant tool wear with the forces and wear associated with cavitation of liquids led to a renewed observation of tool wear in the light of these similarities.

It has been observed that during high speed machining the workpiece metal is heated to a sufficiently high temperature, 2000° to 3000° F., to cause melting of the surface layers of the chips contacting the tool. It is theorized that this molten metal moves rapidly over the surface of the tool during machining and cavitates in the region behind and in front of the cutting edge. Only a thin surface layer of the workpiece metal may melt and contribute to the cavitational forces. The cavitation of this metal generates a shock wave, however, the speed of which is the rate of propagation of the speed of sound in a solid and the primary force vector of which conforms to the periphery of the workpiece causing high energy dissipation through the atomic structure of the workpiece metal. If some of the workpiece metal is ionized these shock waves may cause a disassociation of the workpiece metal along the line of the force vector. This may contribute to the poor machining characteristics of some metals. The shock wave generated by cavitation of the workpiece metal also travels across the tool. The surface layers of the tool or the metal binders of carbide tools are also ionized, as explained, and the cavitational shock wave is sufficiently large to dislodge the tool metal ions. Thus it is thought that the pitting or cratering commonly associated with cavitation of liquids occurs on metal-cutting tools as a result of the ionic migration induced by the cavitation of the workpiece metal.

Consequently this invention broadly resides in a process which reduces electron flow from the tool metal along with its ionization and more specifically, in the devices which have been developed to reduce such electron flow and have improved tool wear.

One feature of this invention is that tool life can be increased without significantly increasing the costs of the machining process.

Another feature of this invention is that the machining characteristics of various workpiece metals can be enhanced.

Yet another feature of the process and device of this invention is that the tool wear is reduced by elimination of a basic cause of the tool wear rather than by a temporary measure which treats the effect.

Still another feature of the device of this invention is that the means for reducing tool wear can be easily attached to standard machining equipment for use with conventional cutting tools for prolonging their life.

These and other features of this invention will become more readily apparent from the detailed description and examples when taken in conjunction with the appended claims and the attached drawings.

DESCRIPTION OF PREFERRED EMBODIMENT

Figure 1:
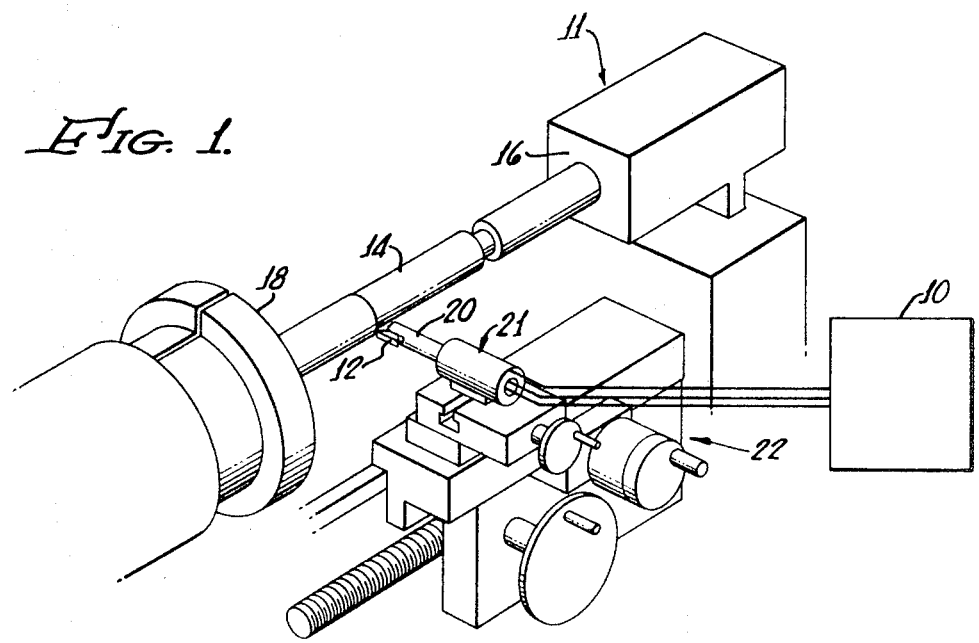
FIG. 1 is a perspective view of a portion of a metal turning lathe with the device circuitry of this invention attached thereto.

FIG. illustrates the ion neutralizer device 10 of this invention mounted on a conventional turning lathe 11 using a triangular cutting tool 12. A metal workpiece 14 is shown mounted between the spindles 16 and 18 of the lathe 11. The tool 12 is mounted on a cylindrical toolpost 20 for reciprocal movement toward and away from the workpiece 14 being turned. The toolpost 20 is mounted in the cylindrical bore of a toolholder 21. The toolholder is adapted to be mounted in a slot on a tool-positioning assembly 22 as shown. The position of the tool 12 is adjusted in a conventional manner by means of the toolholder 21 and the tool-positioning assembly 22 as shown. The tool 21 may be of triangular configuration having the angles of the triangle forming three cutting points. Any tool configuration may be used, however. Additionally the device may be used with milling machines, drills or any other metal-cutting equipment.

Figure 2:
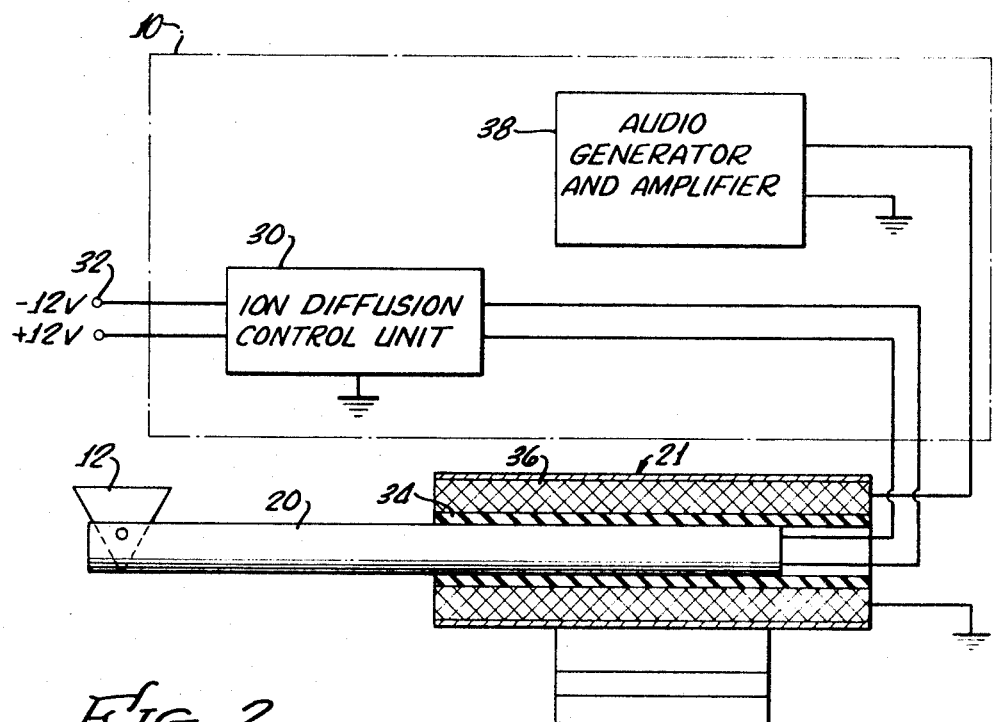
FIG. 2 is a diagrammatic view of the circuitry of the device of this invention as connected to an insulated tool holder.

The preferred device 10, as best shown in FIG. 2, comprises an ion diffusion control unit 30 connected to the toolpost 20 and to a power source 32 which provides positive and negative voltage potentials. The tool post 20 may be insulated from the toolholder 21 by means of a hard rubber lining 34 which maintains the toolpost in position. The toolholder 21 includes a transducer coil winding 36 which is electrically connected to an audio generator and amplifier 38. Advantageously, the ion diffusion control unit 30 may be a high input impedance inverter having a fast response time. For example, an inverter having a unity gain of 1 and providing an input impedance of 500 megohms with a response time of 2 microseconds was found to operate satisfactorily. The power source may be any convenient source of electricity. For example it has been found that a pair of 12-volt storage batteries operate satisfactorily.

The audio generator and amplifier 38 and the transducer coil winding 36 are optionally included in the control circuitry. It has been found that the use of these elements to oscillate the toolpost at the frequency of the generator increases the effectiveness of the device. The use of the ion diffusion control unit alone, however, with insulated toolpost mountings has effectively decreased the tool wear. The effectiveness of the ion diffusion control unit is only slightly reduced if the toolpost is not insulated from the holder.

In operation of the device of this invention, the tool is moved into contact with the rotating workpiece 14 and a current is generated as a chip is removed from the workpiece by the cutting edge of the tool. The direction and magnitude of the electric current generated by contact with the tool and the workpiece are measured by the circuitry and an oppositely directed current is generated and fed through the toolpost into the tool to neutralize the current generated at the tool-workpiece interface. The current which is directed into the tool provides free electrons for reducing ionization of the metal atoms at the tool surface. It has been observed that the cratering tool wear is significantly reduced using this preferred embodiment of the invention as shown in the examples and summarized in table 1. Additionally, the machining efficacy is greatly increased. For example in several cases an audible chatter of the tool against the workpiece was observed during machining when the device 10 was disconnected. This chatter was completely eliminated however by connecting the ion neutralizer device 10 to the tool. A difference in surface finish on the workpiece could also be observed. The surfaces machined without using the ion neutralizer were generally not as even and smooth as the surfaces machined with the ion neutralizer connected. In some instances with difficult to machine alloys the differences were dramatic even without the aid of a microscope.

The audio generator 38 and transducer coil 36, when used, induce oscillation of the tool post by a small distance to accentuate the cavitation of the workpiece metal and reduce the distance between shock waves. The preferred frequency for oscillation has been found to be from about 50 to 100 kc./s.

The following examples illustrate the use of this device with various metals in the machining process and the significant improvements which have been obtained. The same type carbide cutting tool was used in each case. The basic principle involved in each of the examples is the reduction of ionization of the tool metal during the machining process. Basically this is accomplished by insulating the tool from the workpiece and machine frame and by sensing the produced current and generating an oppositely directed current into the tool.

EXAMPLE 1

A titanium alloy bar of about one-half inch in diameter and having a hardness of 36 R "c" was placed in a lathe as shown in FIG. 1 and the tool position was adjusted to make a cut of approximately 0.010 inches in depth. A series of three passes were made along the surface of the titanium alloy bar with the average pass having a length of 1⅝ inches with the device 10 disconnected.

The cutting tool was then adjusted so that a different cutting point was positioned for machining and three passes of the same depth were made with the device connected and operating. When the device was not connected, it was noted that the machining of the alloy was difficult and chatter of the tool was audible and could be observed.

Observation of the cutting tool points under a microscope showed that there was a much greater amount of heat discoloration behind the cutting edge of the tool used with the device disconnected. The amount of erosion or cratering which could be observed on the tool appeared to be about 50 percent greater for the point used with the device disconnected.

The titanium alloy underwent a noticeable amount of work hardening with the device off as is commonly observed during the machining of titanium alloys. With the device on, however, no noticeable work hardening occurred.

EXAMPLE 2

A new cutting tool was used in the lathe to machine a 2-inch diameter bar of 4340 steel which had been heattreated to maximum hardness of about 65—67 R "c." A cut depth of approximately 0.004 to 0.005 inches was taken and the tool was adjusted so that one of its cutting edges enlarged the 4340 steel bar. A series of three passes at 700 r.p.m. was made with the device disconnected. There was a marked heat discoloration of the tool during these passes. Microscopic examination of the cutting tool showed extensive burning at the surface layers immediately behind the cutting edge of the tool and erosion within these areas. Some flank wear was also observable on the surfaces of the tool.

The same procedure was followed using the same depth of cut with a different cutting edge on the tool employed initially to cut the 4340 steel. The device 10 was connected and another series of three passes at 700 r.p.m. was made at a depth of cut of approximately 0.004 to 0.005 inches on the same 4340 bar. A noticeable difference in the tool discoloration was observable with the naked eye. Microscopic examination of the cutting edge of the tool showed that there was substantially reduced wear at the cutting edge and behind it. Erosion appeared to be reduced by at least 50 percent and flank wear was reduced by about 25 percent.

The machined bar itself was also examined microscopically and there was a noticeable difference between the portion machined with the device 10 connected and the portion machined with the device disconnected. The portion of the bar which had been machined when the device of this invention was connected was smooth and even in appearance. The portion of the bar which was machined when the device of this invention was disconnected appeared to have a rippled surface caused by chattering of the tool against the surface of the workpiece. In general the finish and appearance under the microscope of the portions machined with the device connected and operating were superior to the other machined portions of the bar.

EXAMPLE 3

An aluminum alloy bar having a hardness substantially less than the titanium or 4340 bars and a diameter of about 1¾ inches was placed in the turning lathe and a new cutting tool of the same material was employed. The cutting tool was adjusted in the toolholder so that one of its cutting points was set to cut a depth of about 0.020 inches on the aluminum alloy surface. A series of 10 passes having a length of about 24 inches was made on the aluminum alloy bar at this depth of cut with the tool. The tool was then removed from the toolpost and observed microscopically. There was a great deal of heat discoloration behind the cutting edge of the tool. A small amount of tool erosion was observable.

The tool was removed from the toolpost and a different cutting point of the tool was adjusted to make a cut at the same depth along the surface of the aluminum alloy bar. The bar was machined with this edge of the tool for 10 passes each of which had an approximate length of 24 inches at 700 r.p.m. The device of this invention was connected during this machining procedure. The tool was removed from the toolpost and the cutting edges microscopically examined. The cutting edge used with the device 10 connected showed only slight heat discoloration and approximately 50 percent less erosion than the other cutting edge. It was also observed that the buildup of aluminum on the tool surface was much less when the device 10 was connected. The characteristics of the machining of the aluminum alloy did not appear to be significantly different either with the ion neutralizer device of this invention connected or with the device of the invention disconnected.

EXAMPLE 4

A ⅝-inch diameter rod of a high temperature alloy Unimet which is ordinarily very difficult to machine was machined with a carbide tool as used in examples 1 through 3 with the device 10 disconnected. The Unimet alloy had a hardness of 25 to 28 R "c" and the following nominal composition:

| | |
|---|---|
| Carbon | 0.15 max. percent by weight |
| Chromium | 15.00–20.00 |
| Cobalt | 13.00–20.00 |
| Molybdenum | 3.00–5.00 |
| Titanium | 2.50–3.25 |
| Aluminum | 2.50–3.25 |
| Boron | 0.010 max. |
| Sulfur | 0.015 max. |
| Iron | 4.00 max. |
| Silicon | 0.75 max. |
| Manganese | 0.75 max. |
| Nickel | Remainder |

The depth of cut was approximately 0.005 inch and two passes were made at a speed of about 700 r.p.m. The length of each pass was approximately 5 inches. The tool cutting edge was effectively destroyed during the machining of the Unimet alloy in these two passes. Severe cratering was observed along with noticeable flank wear.

The same Unimet alloy was machined at the same speed, depth of cut, and machining rate using the same carbide tool with a different point positioned for machining and with the device 10 connected.

After two passes the tool was still usable for further machining. Microscopic examination showed that flank wear and erosion decreased about 50 percent under the same machining conditions with the device 10 connected. The heat discoloration on the tool surface was much greater without the device 10 connected.

EXAMPLE 5

A ½-inch diameter bar of T–15 tool steel having a hardness of between 18 and 23 R "c" was machined with a similar carbide tool at a depth of cut of about 0.015 inches and a speed of 700 r.p.m. The device 10 was disconnected from the toolpost and five passes of approximately 6 inches in length were made on the T–15 tool steel bar.

The device 10 was then connected to the tool post and the tool was oriented so that another cutting edge was positioned for machining the bar. Again five passes of approximately 6 inches in length were made at a depth of about 0.015 inches along the surfaces of the bar.

The heat discoloration produced during machining with device 10 disconnected was noticeably greater than when the device 10 was connected. Erosion behind the cutting edge of the tool was reduced 25 to 35 percent when the device 10 was connected as observed under the microscope. Additionally a greater amount of workpiece metal was observed to be built up behind the leading surfaces of the tool when the device was disconnected than when the device 10 was connected and operating.

EXAMPLE 6

A 1 7/16-inch diameter bar of high-speed M-2 steel having a hardness of 18 to 23 R "c" was machined with the device 10 disconnected. The depth of cut was approximately 0.015 inches and the machining speed was about 700 r.p.m. A series of 25 passes having a length of 10 inches each was made along the bar.

The device 10 was then connected with the toolpost and the tool oriented so that a new cutting edge was positioned for machining the bar. Again a series of 25 passes at the same depth of cut and cutting speeds were made along a 10-inch section of the bar.

The erosion and flank wear of the tool cutting edge were then observed under a microscope. It was determined that the erosion was decreased about 50 percent with the device 10 connected to the cutting tool. The flank wear appeared to be about 25 to 35 percent less with the device connected. The buildup of workpiece metal on the tool surfaces was significantly less for the passes made with the device 10 connected than when the device was disconnected.

The results of examples 1 through 6 are summarized in table 1. In each instance the tool was a T-22 grade Firth Sterling carbide cutting tool of the following typical composition: 80.50 percent tungsten carbide, 7.0 percent cobalt, 7.0 percent titanium and 5.5 percent tantalum. The hardness of this tool material is approximately 92 on the Rockwell "A" scale and its density is 12.75 g./cc. The transverse rupture strength of this carbide tool material is about 270,000 p.s.i.

The results are believed to be applicable to all such cutting tools including other carbides and other metals since the basic principle behind the erosion and flank wear would be the same. The critical requirement for reduction in tool wear in accordance with this invention is that the ionization of the tool metal atoms be reduced by supplying electrons to compensate for the current produced during machining or by insulation of the machining elements from each other and from the machine frame so that substantially no current flow or minimum current flow occurs.

The proposed theory of operation of the device of this invention has been hypothesized to explain these observed results. The current produced by the heating of the tool and workpiece during machining can actually be observed on an oscilloscope thus some ionization must occur. The reduction of current flow consistently increases the tool life, as observed, and generally produces better machining characteristics and better surface appearance of the workpiece.

Observation of the current produced showed that it pulsed as would be expected if the ions were being dislodged by cavitation of the molten workpiece metal. As tee metal moves rapidly over the tool surface the pressure about the metal is increased until the vapor pressure of the metal is reached. At this point cavitation occurs due to incipient vaporization of the metal creating a shock wave which moves ahead of the tool through the metal workpiece and contacts the tool at a point behind its cutting edge. If the tool has been ionized by the generation of an electric current during the heating at the tool-workpiece interface in accordance with the Peltier effect, the cavitational shock waves dislodge some of these ions and produce the observed cratering or erosion of the tool. Additionally the displacement of ions may cause the observed pulsing of electron flow. The device of this invention prevents the formation of ions by neutralizing the electric currents which are generated. In this manner electrons are resupplied to the metallic atoms and ions are not formed. The atoms themselves have a stronger bonding energy with the tool and are not easily dislodged by the cavitational forces.

It has been further observed that rapid oscillation of the tool toward and away from the workpiece during machining in relatively short strokes further reduces tool wear and enhances the workpiece finish. It has been theorized that the reason for the reduction in tool wear by such oscillation of the tool is that the shock waves generated by cavitation of the liquid metal are more closely spaced together when oscillation occurs and the frequency of the shock waves is increased. In this fashion, the shock waves occur as a regular pressure on the tool rather than a series of high-amplitude forces and thus the overall effect of the shock waves is increased. In combination with the use of the device of this invention, the rapid oscillation by a small amplitude for example approximately one-thousandth of an inch of the toolpost has appeared to be effective.

The specific device disclosed is the preferred embodiment

| Example | Material | Hardness R "c" | Depth of cut (inches) | No. of passes each with and without device on | Speed, r.p.m. | Length of each pass (Inches) | Observations | Tool |
|---|---|---|---|---|---|---|---|---|
| 1 | Ti alloy (bolt- ½ inch dia.) | 36 | .010 | 3 | 700 | 1⅝ | Noticeable chatter when device off. No chatter with device on. No work hardening with device on. Marked difference in discoloration. Flank wear-about same. Erosion decreased by about 50% with device on. Excessive work hardening with device off. | T-22 Carbide Firth Sterling. |
| 2 | 4340 steel (bar 2 inch dia.) | 65-67 | .004-.005 | 3 | 700 | 9 | Flank waer decreased 25% Erosion wear decreased 50%. Marked difference in discoloration. Chips appeared to come off hotter. | T-22 Carbide Firth Sterling. |
| 3 | Al (bar stock- 1¾ inch dia.) | Soft | .020 | 10 | 700 | 24 | Build up of aluminun on the tool significantly less with device on. Significantly greater discoloration with device off. Cratering and erosion reduced about 50% with device on. | T-22 Carbide Firth Sterling. |
| 4 | Unimet high temp. alloy (rod-⅝ in. dia.) | 25-28 | .005 | 2 | 700 | 5 | Tool ineffective for further use when device off. Flank wear and erosion decreased 50% with device. Heat discoloration much greater to naked eye without device. Tool with device still usable after 2 passes. device. Tool ith device still usable after 2 passes. | T-22 Carbide Firth Sterling. |
| 5 | T-15 tool steel (bar about ½ inch dia.) | 18-23 | .015 | 5 | 700 | 6 | Much greater heat discoloration with device off. Greater workpiece metal build up with device off Erosion 25-35% less. | T-22 Carbide Firth Sterling. |
| 6 | M-2 high speed steel (1⅞₆ inch bar stock). | 18-23 | .015 | 25 | 700 | 10 | Flank wear decreased 25-30%. Erosion decreased 50%. Build up of workpiece metal on tool significantly less with device on. | T-22 Carbide Firth Sterling. | of the means for preventing ionic migration from the tool surface and reducing cratering of the tool during the machining operation. As mentioned, however, significant increases in tool life and reduction in cratering can be obtained by insulating the workpiece or the tool from the machine frame so that a complete circuit will not be made between the workpiece and the tool through the frame. Although, the observed increases in tool life and reduction of tool wear have not been as great by the use of such a procedure alone for reducing the formation of ions on the surface of the tool, a significant increase in resistance to cratering should be obtainable by this procedure. The theory for operation and the effect of such insulation of the tool or workpiece from the machine frame has been substantiated by the observations made with the current-detecting and -generating device of this invention as described and shown in FIG. 2.

This invention is applicable for use with conventional machinery and tools so that no excessive modifications of existing equipment need be made.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

I claim:

1. A process for machining metals at speeds high enough to heat the workpiece and the tool comprising the steps of:
    providing a metal workpiece;
    providing a metal tool for cutting said workpiece metal;
    contacting said workpiece with said tool in a manner sufficient to cut said workpiece and increase the temperature of both said workpiece and said tool;
    sensing the magnitude and polarity of current flow from said tool during machining; and
    supplying electrons to said tool in response to the sensed current flow to reduce wear of the tool metal.

2. A process as defined in claim 1 wherein the opposite polarity current flow is substantially equal to the sensed current flow.

3. A process as defined in claim 1 wherein said current flow is further reduced by insulating said tool from the frame of the machine during the machining of said workpiece metal.

4. An assembly for connecting to a metal-cutting machine comprising:
    means electrically connectable to the cutting tool of said metal cutting machine for sensing the current generated when said tool is machining a metal;
    means electrically connected to said sensing means for producing an electrical current of opposite polarity and magnitude; and
    means for directing said current into said tool for reducing formation of ions on said tool.

5. An assembly as defined in claim 4 wherein said sensing and producing means comprise a high input impedance inverter having a fast response time.

6. An assembly as defined in claim 4 further including a toolholder having an insulating material therein for receiving and maintaining a toolpost in contact with said insulating material, said toolholder being mountable on a metal-cutting machine for maintaining said toolpost and tool out of electrical contact with said machine.

7. An assembly as defined in claim 4 wherein said toolholder includes a transducer coil for surrounding said toolpost and an audio generator and amplifier for rapidly oscillating said toolpost within said toolholder.

8. A tool-holding assembly for mounting a metal-cutting tool on a metal-working machine including means for reducing the ionization of the metal in said cutting tool during machining of a metal, said means comprising a current flow sensing means and a high input impedance inverter having a fast response time which is connected to said tool for directing an opposite polarity, substantially equal magnitude, current into said tool.